(12) United States Patent
Porter (10) Patent No.: US 12,434,448 B2
(45) Date of Patent: Oct. 7, 2025

(54) PRE-STRESSED PULTRUDED GLASS FIBER REINFORCED LUMBER

(71) Applicant: Mark A. Porter, Jacksonville, FL (US)

(72) Inventor: Mark A. Porter, Jacksonville, FL (US)

( * ) Notice: Subject to any disclaimer, the term of this patent is extended or adjusted under 35 U.S.C. 154(b) by 0 days.

(21) Appl. No.: 19/190,585

(22) Filed: Apr. 25, 2025

(65) Prior Publication Data

US 2025/0249647 A1    Aug. 7, 2025

Related U.S. Application Data

(63) Continuation-in-part of application No. 18/497,968, filed on Oct. 30, 2023.

(60) Provisional application No. 63/639,253, filed on Apr. 26, 2024.

(51) Int. Cl.
| | |
|---|---|
| *B29C 70/52* | (2006.01) |
| *B29C 48/04* | (2019.01) |
| *B29C 70/08* | (2006.01) |
| *B29C 70/34* | (2006.01) |
| *B29K 27/06* | (2006.01) |
| *B29K 101/12* | (2006.01) |
| *B29K 309/08* | (2006.01) |

(52) U.S. Cl.
CPC .............. *B29C 70/52* (2013.01); *B29C 48/04* (2019.02); *B29C 70/081* (2013.01); *B29C 70/34* (2013.01); *B29K 2027/06* (2013.01); *B29K 2101/12* (2013.01); *B29K 2309/08* (2013.01)

(58) Field of Classification Search
CPC ....... E02D 27/525; E02D 5/226; E02D 5/285; E02D 2300/0045; E02D 2200/1685; E02D 2250/0015; E02D 2300/0007; E02D 2300/0053
See application file for complete search history.

(56) References Cited

U.S. PATENT DOCUMENTS

| | | | | |
|---|---|---|---|---|
| 5,706,620 | A * | 1/1998 | De Zen | H02G 3/286 |
| | | | | 52/270 |
| 11,186,961 | B2 * | 11/2021 | Porter | E02D 5/24 |
| 11,808,005 | B2 * | 11/2023 | Porter | E02D 27/525 |

* cited by examiner

*Primary Examiner* — Lynda Salvatore
(74) *Attorney, Agent, or Firm* — Mark Young PA (57) ABSTRACT

A pre-stressed pultruded glass fiber reinforced thermoplastic lumber suitable for demanding construction environments, particularly marine and outdoor applications, features a solid core composed of a thermoplastic, such as PVC, blended with 15% to 40% by weight of pelletized chopped strand glass fibers. Pre-tensioned elongated continuous fiber reinforcements are embedded within and coextensive with this core via pultrusion. The presence of pelletized and fragmented glass fibers within the core enhances the mechanical coupling between the core and the continuous reinforcements, facilitating the transfer of tensile stress to the core as compressive pre-stress. An outer co-extruded cap stock provides protection against UV and IR radiation and enhances impact resistance. The resulting lumber exhibits a high modulus of elasticity (exceeding 800,000 psi), at least 60% fiber length retention, improved durability, and resistance to common wood degradation factors without the use of toxic chemicals.

21 Claims, 4 Drawing Sheets

PRE-STRESSED PULTRUDED GLASS FIBER REINFORCED LUMBER

CROSS-REFERENCE TO RELATED APPLICATIONS

This application is a nonprovisional of and claims the benefit of priority of U.S. Provisional Application 63/639,253 file Apr. 26, 2024, the entire contents of which are incorporated herein and made a part hereof by this reference.

BACKGROUND OF THE INVENTION

This invention relates generally to structural materials used in construction and, more particularly, to a cost-effective, extruded thermoplastic lumber with internal reinforcement and pre-stressing. The invention is designed to overcome the inherent limitations of traditional wood lumber, especially in harsh environments such as marine and outdoor construction.

Conventional wood lumber, while widely utilized for its availability and ease of use, suffers from several well-documented vulnerabilities that significantly reduce its longevity and structural reliability. These include:

Fungal Decay: Wood-decaying fungi can compromise structural integrity over time, particularly in damp or humid environments.

Insect Infestation: Termites, wood-boring beetles, and other pests can cause substantial material loss and weakening by consuming or tunneling through the wood.

Moisture Sensitivity: Wood readily absorbs water, leading to swelling, warping, rot, and mold or mildew growth, all of which degrade performance and dimensional stability.

Ultraviolet (UV) Degradation: Prolonged exposure to sunlight causes surface breakdown, embrittlement, and a gradual loss of strength.

Chemical Degradation: Contact with acids, alkalis, or corrosive substances can lead to deterioration, particularly in industrial or marine applications.

In efforts to mitigate these issues, chemically treated wood preservatives have historically been employed. However, the use of such preservatives—often pesticides and biocides—has raised environmental and health concerns, particularly in sensitive ecosystems like marine environments. There, leaching of toxins into surrounding waters can endanger aquatic life and pose long-term risks to human health. As a result, regulatory restrictions increasingly limit or prohibit the use of these chemical treatments in many applications.

The principle of pre-stressing reinforcing elements is well established in structural engineering, especially in concrete construction. In pre-stressed concrete, steel tendons or cables are tensioned prior to casting. After the concrete sets, the tension is released, transferring compressive force to the concrete, thereby improving its structural performance, load-bearing capacity, and resistance to cracking.

This same concept has been explored in thermoplastics. For instance, U.S. Pat. No. 5,096,645 discloses a method of embedding a stressed reinforcing element within an extruded plastic via pultrusion. However, such techniques face a critical engineering challenge: after the thermoplastic cures and the tensile force is released, the reinforcing element naturally attempts to contract. This contraction can disrupt the physical bond between the reinforcement and the plastic matrix, leading to delamination or debonding. The result is a loss of the intended compressive prestress and reduced structural effectiveness.

A particularly relevant application is in marine dock construction, where pilings are driven into the seabed and connected via crossbeams and longitudinal stringers. The strength and stiffness of these stringers are crucial because they determine the maximum allowable spacing between pilings. Greater strength permits wider spans, thereby reducing the number of pilings needed—significantly lowering both material costs and installation labor.

According to classic beam theory, a stringer subject to a downward force behaves as a simply supported beam. Its vertical deflection is directly proportional to the cube of its span length and inversely proportional to its modulus of elasticity. Therefore, increasing the modulus of elasticity of the stringer allows for greater spans under the same load without compromising structural deflection limits.

Thus, there is a clear and compelling need for a pre-stressed, extruded structural member that addresses the limitations of wood and overcomes the bonding challenges encountered in thermoplastic reinforcement. Such a material should:

Maintain an effective and durable bond between the reinforcement and plastic matrix after curing and stress release.

Exhibit a higher modulus of elasticity than comparably sized wood members, enabling greater spans and reduced piling count.

Be inert to marine organisms and resistant to biological degradation.

Contain no toxic chemicals that could leach into aquatic environments.

Be workable with conventional tools—cut, drilled, or fastened as easily as wood.

Withstand long-term exposure to sun, rain, temperature fluctuations, and UV radiation without degrading.

The present invention addresses these needs and overcomes one or more of the technical limitations identified above by providing a novel, pre-stressed, internally reinforced thermoplastic structural member optimized for demanding construction environments.

SUMMARY OF THE INVENTION

To address the challenges outlined above, an exemplary implementation of the invention provides an integrally formed extruded thermoplastic lumber. This lumber is a solid structure, typically shaped as a rectangular prism, comprising a thermoplastic matrix, such as polyvinyl chloride (PVC), reinforced with chopped strand glass fibers derived from pelletized glass fibers. The thermoplastic, pelletized glass fibers, and various additives are thoroughly mixed and then processed through extrusion.

An outer protective layer, referred to as a cap stock, is co-extruded with the core material to enhance impact resistance, provide crucial protection from ultraviolet radiation, and reflect infrared radiation. The cap stock may also incorporate a colorant and be textured to enhance surface friction and/or achieve a desired aesthetic appearance. Due to the absence of pellets and glass fibers in the cap stock and the controlled sizing process, the outer surface is relatively smooth and dimensionally consistent, free from significant projections or surface irregularities.

Extending axially beneath the cap stock, typically through the core of the structure, are continuous reinforcements, such as continuous strands (rovings) or plys (ribbons, mats, fabrics, and veils). These continuous reinforcements are incorporated into the extruded thermoplastic lumber through a pultrusion process and are subjected to a predetermined tensile stress during this manufacturing stage.

Enhanced frictional engagement between the continuous reinforcements and the core is provided by the presence of the chopped strand glass fibers. During extrusion, some of the pelletized glass fibers remain wholly or partially intact, while others dissociate into separated fibers or form clumps of fibers, all encapsulated within the thermoplastic core. This intimate contact between the continuous reinforcement and the heterogeneous extruded mix of thermoplastic, fiber pellets, clumps, and separated strands creates superior friction and mechanical interlocking, significantly reducing the risk of decoupling (delamination or debonding) after the tensile stress is removed from the continuous reinforcement.

An exemplary extruded thermoplastic lumber may be produced in nominal sizes such as 2×4, 2×6, 2×8, 2×10, or 2×12 inches, with corresponding actual sizes of 1½×3½, 5½, 7¼, 9¼, and 11¼ inches, respectively.

Integrally formed extruded thermoplastic lumber according to principles of the invention is designed for construction applications, particularly in harsh marine and outdoor environments, overcoming the limitations of traditional wood. The lumber comprises a core made from a blend of a thermoplastic, preferably polyvinyl chloride (PVC), and 15% to 40% by weight of pelletized chopped strand glass fibers, with a preferred range of 20% to 35% E-glass fibers having an initial average length of 0.125 to 0.50 inches. During extrusion, these pellets break into individual strands, clumps, and remain intact, creating a heterogeneous matrix. A plurality of elongated continuous fiber reinforcements, such as fiberglass rovings or plys, are pre-tensioned and pultruded axially within and coextensive with the core. A co-extruded capstock forms the outer surface, providing protection against UV and infrared radiation, enhancing impact resistance, and allowing for coloration, texturing, and the incorporation of retroreflective particles in an acrylic or PVC matrix.

The unique combination of pelletized chopped strand glass fibers within the core enhances the mechanical coupling between the core and the continuous reinforcements, facilitating the transfer of tensile stress to the core as compressive pre-stress. The process aims to retain at least 60% of the initial average length of the chopped glass fibers after extrusion, potentially achieved by using a secondary feed port for minimal shear introduction of the fibers. The core may also contain additives such as lubricants, plasticizers, heat stabilizers, impact modifiers, processing aids, coupling agents, and low molecular weight PVC to improve processing and performance. This innovative design results in a lumber with a high modulus of elasticity, exceeding 800,000 psi and potentially reaching 1,200,000 psi or more, improved durability, and resistance to common wood degradation factors without toxic chemicals. The manufacturing method involves blending the core materials, extruding the core, pultruding the pre-tensioned reinforcements, co-extruding the capstock, and cooling the resulting lumber, with potential control of puller speed to regulate thickness.

This invention describes an integrally formed, extruded thermoplastic lumber product designed for enhanced strength and durability. The fundamental structure comprises three main components. Firstly, a core material is formed from a blend of a polyvinyl chloride (PVC) thermoplastic and chopped strand glass fibers. A crucial aspect of the manufacturing process is that it preserves the integrity of these fibers, ensuring at least 60% of their initial average length is retained after extrusion. Secondly, embedded within this core and running axially along its entire length are multiple elongated continuous fiber reinforcements. These reinforcements are actively pre-tensioned and pultruded as part of the extrusion process, contributing significantly to the lumber's structural properties. Thirdly, the product features a co-extruded capstock layer, which forms at least one of the outer surfaces, providing protection and potentially aesthetic finishing.

Several variations detail the specific materials and compositions used. The chopped strand glass fibers incorporated into the core can be introduced during manufacturing in a convenient pelletized form. In specific formulations, these pelletized fibers may constitute between 15% and 40% by weight of the core material. Following the extrusion process, these chopped fibers typically exist within the core in a heterogeneous mixture, comprising individual strands, clumps of fibers, and even some remaining intact or partially broken-down pellets.

The elongated continuous fiber reinforcements can also vary; common forms include fiberglass rovings or plys, selected based on desired strength characteristics. The protective capstock layer can be enhanced by including additives such as ultraviolet (UV) inhibitors and infrared (IR) inhibitors, improving the lumber's resistance to weathering and heat absorption. Furthermore, the PVC core itself can be tailored by incorporating various additives to modify its properties. These additives might include lubricants, plasticizers, heat stabilizers, impact modifiers, processing aids, coupling agents (to improve bonding between components), or low molecular weight PVC.

The resulting thermoplastic lumber exhibits significant mechanical strength. It is designed to achieve a modulus of elasticity (a measure of stiffness) of at least 800,000 psi, with some embodiments reaching or exceeding 1,200,000 psi.

In certain embodiments, a foaming agent is introduced into the core material blend. This agent creates a cellular structure within the core during extrusion, leading to a product with reduced density (and thus lower weight) and potentially improved workability (e.g., ease of cutting or fastening). The concentration of the foaming agent typically ranges from 0.1% to 5% by weight of the thermoplastic polymer. Both chemical blowing agents (which decompose to release gas) and physical blowing agents (like injected gas) can be used. The inclusion of a foaming agent can reduce the lumber's weight by at least 5%. Remarkably, even with reduced density, the foamed lumber maintains high strength, exhibiting a flexural strength at least twice that of conventional pine lumber of similar dimensions, and in some variations, at least four times that of pine.

A key aspect of the invention's performance lies in the synergistic interaction between the different fiber components within the core. The chopped strand glass fibers (in their various forms like strands, clumps, and pellets) interact physically with the continuous fiber reinforcements. This interaction creates mechanical couplings through entanglement and increases friction at the interface between the continuous reinforcements and the surrounding PVC matrix. This mechanism is crucial for resisting delamination, which is the separation of the continuous reinforcements from the core material. The rough surface texture imparted by the presence and varied orientations of the chopped fibers further enhances this frictional bond.

One specific example describes an extruded lumber product with a core made of PVC blended with 20% to 35% by weight of chopped strand E-glass fibers, initially having an average length between 0.125 and 0.50 inches. This core contains embedded, pre-tensioned, pultruded fiberglass rovings running its length and is covered by a co-extruded capstock. This particular configuration yields a product with a modulus of elasticity exceeding 800,000 psi. Consistent with other descriptions, the chopped E-glass fibers within this core can form a heterogeneous mix of strands, clumps, and pellets.

A processing refinement is also mentioned: to better preserve the length of the chopped E-glass fibers, they can be introduced into the extruder through a secondary feed port located downstream from the primary melting zone. This placement subjects the fibers to less shear stress during processing, helping to maintain their structural integrity and contribution to the final product's strength.

BRIEF DESCRIPTION OF THE DRAWINGS

The foregoing and other aspects, objects, features, and advantages of the invention will become better understood with reference to the following description, appended claims, and accompanying drawings, where:

Those skilled in the art will appreciate that the figures are schematic in nature and are not intended to be drawn to any particular scale; nor are the figures intended to illustrate every possible embodiment of the invention. The invention is not limited to the exemplary embodiments depicted in the figures or the specific components, configurations, shapes, relative sizes, ornamental aspects, or proportions as shown.

DETAILED DESCRIPTION OF THE INVENTION

Figure 1:
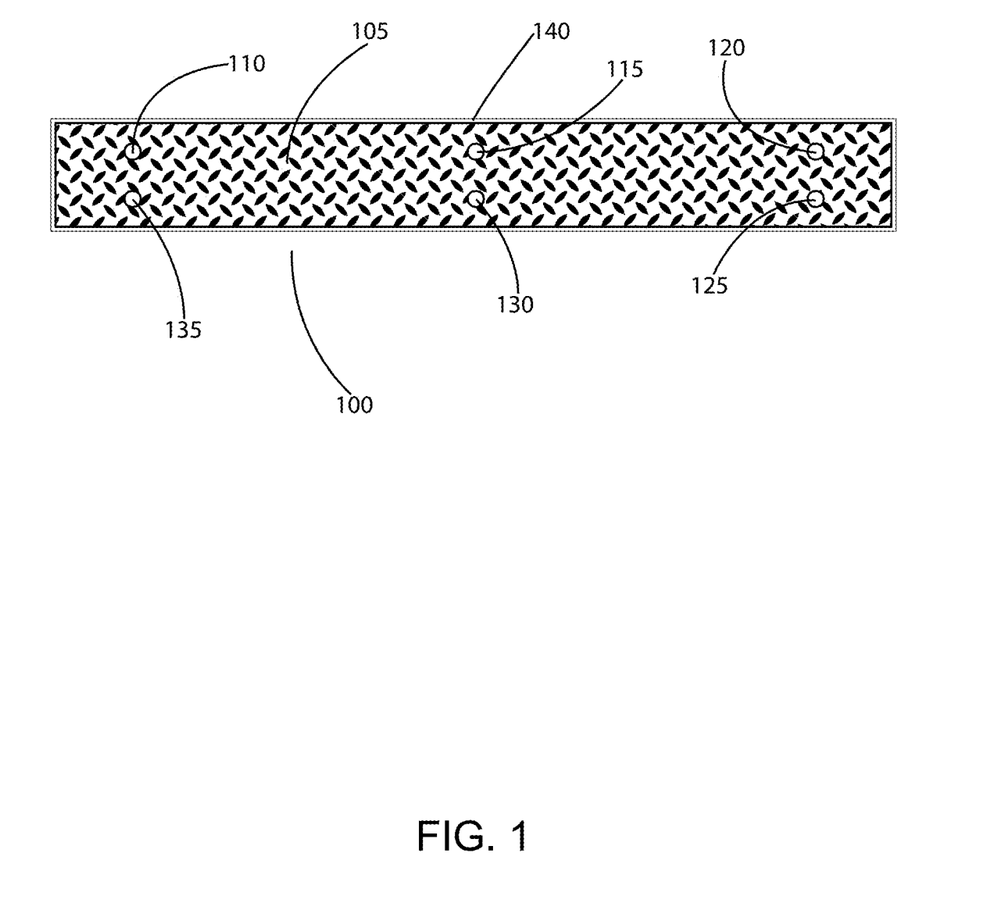
FIG. 1 is a profile view of an exemplary extruded thermoplastic pre-stressed lumber according to principles of the invention.
Figure 2:
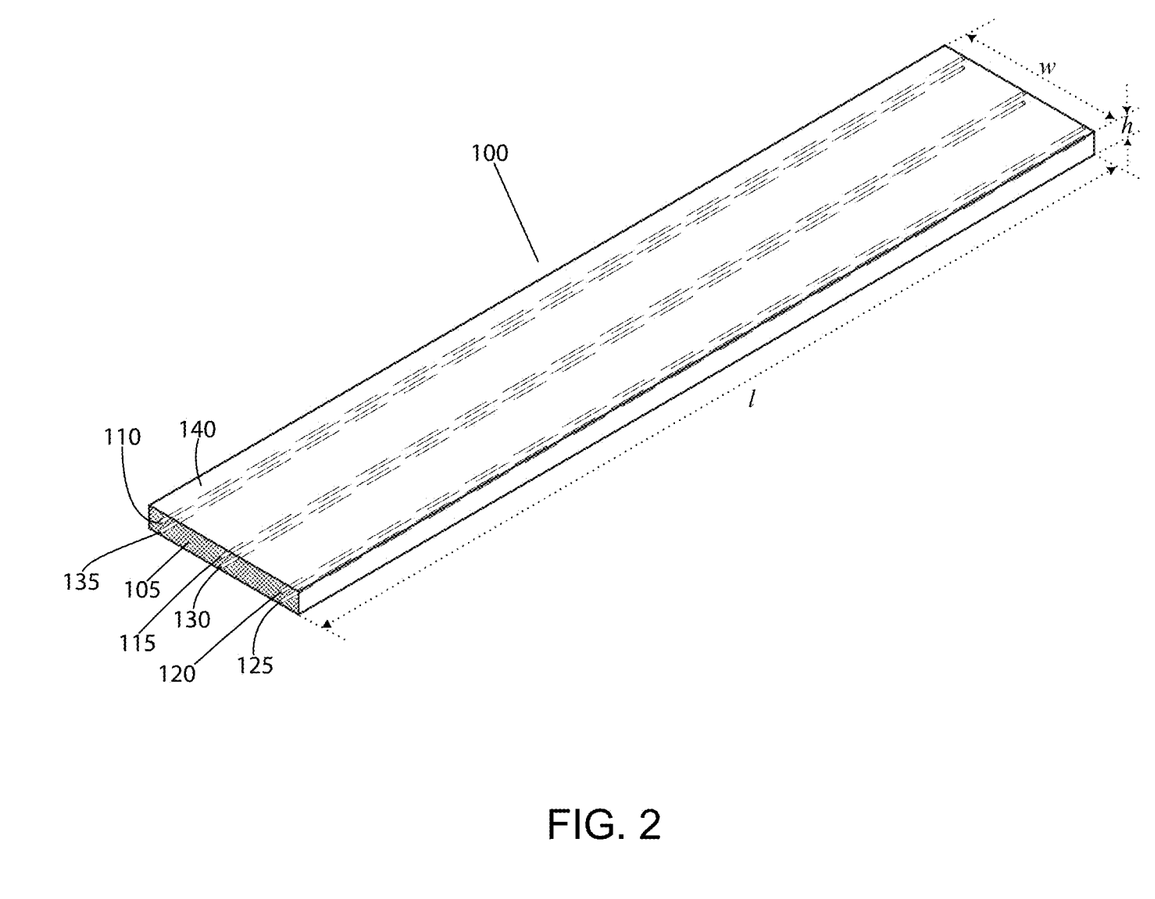
FIG. 2 is a perspective view of an exemplary extruded thermoplastic lumber according to principles of the invention.

Referring to FIGS. 1 and 2, an exemplary extruded thermoplastic lumber 100 according to principles of the invention includes an inner core 105 composed of a thermoplastic (e.g., PVC) and glass fibers derived from pellets. During the manufacturing process, the shear forces within the extruder cause some pellets to break down into separate strands of glass fibers, while others remain wholly or partially intact, and some fracture into clumps of fibers. All these forms of glass fiber are encapsulated within the core 105 of the lumber 100. Elongated fiber reinforcements 110-135 (e.g., rovings) extend longitudinally (axially) through the extruded lumber, being coterminous and coextensive with the core 105 (i.e., spanning from end to end). While the illustrations show six fiber reinforcement rovings, it should be understood that the invention is not limited to any specific number, shape, or spacing of these elongated fiber reinforcement rovings. Fewer or more than six fiber reinforcements in the form of rovings, ribbons, mats, fabrics, and veils may be employed without deviating from the scope of the invention. Critically, the fibers 110-135 are subjected to tensile stress as they are introduced into the molten extrudate via the pultrusion process. After the extruded structure cools, cures, and is cut to the desired length, at least a portion of this applied tensile stress is transferred from the embedded fibers 110-135 to the surrounding core 105 as compressive stress, resulting in a pre-stressed plastic structure.

As the material progresses through the extruder, shear forces act upon the pellets, causing a range of outcomes: some pellets disintegrate into discrete individual strands, others fracture into clumps, and some remain wholly or partially intact. The resulting heterogeneous distribution of glass fiber forms—including strands, clumps, and intact pellets—is uniformly encapsulated within the core 105. The presence of separate strands of glass fibers, intact or partially intact pellets, and clumps of glass fibers within the core 105 creates a microscopically rough (rough surface texture) and mechanically interlocking structure that maintains an exceptionally intimate coupling between the core and the embedded fiber reinforcements 110-135. This robust mechanical bond significantly reduces the risk of separation (decoupling, such as delamination or debonding) between the core 105 and the fiber reinforcements 110-135. This ensured coupling is crucial for the effective transfer of the tensile stress from the embedded fiber reinforcements 110-135 to the core 105, thereby achieving the beneficial prestressing effect.

The outer surface of the structure 100 is formed by a co-extruded capstock 140. The capstock 140 serves multiple critical functions, including providing protection against harmful UV and infrared radiation, as well as offering an aesthetically pleasing and durable outer surface. Various textures and patterns, including those that mimic the appearance of natural wood grain, can be imparted to the capstock during manufacturing using heated rollers and pressure.

In an exemplary embodiment, the extruded thermoplastic lumber 100 is comprised of an extruded rigid thermoplastic, such as polyvinylchloride (PVC), incorporating glass fiber reinforcement. PVC is particularly advantageous due to its relatively low cost, inherent resistance to environmental degradation (including exposure to various chemicals and alkalis), high hardness for a plastic material, and outstanding tensile strength in its class. Furthermore, PVC is widely available, commonly used in numerous applications, readily recyclable, and available as a recycled material. However, it is important to note that the invention is not strictly limited to PVC; other extrudable thermoplastics, including but not limited to acrylonitrile butadiene styrene (ABS), polyoxymethylene (POM), and various polyolefins (e.g., high-density polyethylene and polypropylene), may be suitable for use within the spirit and scope of the invention.

In the composite structure, the thermoplastic material without fiber reinforcement acts as the matrix. The degree to which strength and rigidity are enhanced in this fiber-reinforced plastic is dependent upon the intrinsic mechanical properties of both the reinforcing fiber and the matrix material, their relative volumetric proportions within the composite, and the fiber length and orientation within the matrix. In the exemplary embodiment described herein, the chopped strand glass fibers assume orientations that arise naturally during the extrusion process. Microscopic examination has revealed that, post-extrusion, the fibers exhibit a range of orientations, with some aligned in the direction of melt flow and others oriented randomly. In the extrusion process described, chopped glass fibers generally adopt random orientations due to the flow dynamics within the extruder. Microscopic examination has shown that, post-extrusion, the fiber orientations range from aligned with the direction of melt flow to fully random. This quasi-random orientation is considered advantageous in certain structural contexts, as it provides mechanical reinforcement in multiple directions, enhancing multidirectional performance.

PVC exhibits a very high viscosity in its typical processing temperature range, which can complicate the incorporation and processing of reinforcing fibers. To improve processability, various additives may be introduced into the thermoplastic mix. An exemplary PVC matrix may begin as a commercially available, free-flowing, granular powder. Additives such as one or more plasticizers, including but not limited to dioctyl terephthalate (DOTP), can be utilized to decrease the viscosity of the polymer melt, thereby improving both flexibility and overall durability of the final product.

A lubricant may be incorporated into the formulation to reduce friction at various interfaces: between the processing machinery and the plastic materials, between the individual polymer molecules, and between the polymer molecules and the reinforcing fibers. Lower friction generally results in improved processing characteristics for the underlying plastic melt. ORC-A (calcium acetylacetonate) serves as a non-limiting example of a suitable lubricant.

A heat stabilizer is often essential in PVC formulations to significantly enhance the material's resistance to thermal degradation by scavenging hydrochloric acid (HCl) molecules that may be released during the extrusion process. Without an effective heat stabilizer, exposure of PVC to elevated temperatures (above approximately 100° C.) can initiate the elimination of HCl from the polymer backbone, triggering a self-catalyzing degradation process that leads to rapid discoloration and embrittlement of the PVC matrix. Non-limiting examples of heat stabilizers include barium-zinc, calcium-zinc, or aluminum magnesium carbonate hydroxide (hydrate) additives.

To further enhance the long-term performance of the extruded lumber, an impact modifier may be added to improve its overall durability and toughness. In addition to enhancing impact performance, several other critical characteristics, such as tensile properties, weatherability, processability, flammability, and heat distortion temperature, can also be positively influenced by the inclusion of an appropriate impact modifier. A non-limiting example of an impact modifier suitable for this application is precipitated calcium carbonate (PCC).

Serving both as a primary reinforcement and a key contributor to the frictional enhancement necessary for bonding with the continuous fibers are chopped strand glass fibers. These fibers are typically composed of oxides of silicon, calcium, aluminum, magnesium, and/or boron. A common type of glass fiber used in such applications is E-glass, which is an alumino-borosilicate glass containing less than 1% (by weight) of alkali oxides. These fibers are produced as small diameter (e.g., approximately 5 to 18 μm) strands, each having a relatively short length (e.g., about 0.125 to 0.50 inches).

In a preferred embodiment, pelletized glass fibers are utilized. Each pellet, roughly the size of a grain of rice, is an agglomeration or clump of numerous individual short strands of glass fibers held together by a binder. These pelletized clumps of fibers, when introduced into the extrudate, contribute to the presence of small pellet-like lumps within the extruded product. These bumps are often perceptible both visually and by touch. During the extrusion process, the mechanical forces and shear stresses cause some pellets to remain intact, while others are broken apart wholly or partially, resulting in a distribution of intact pellets, clumps of fibers of varying sizes, and individual separated chopped fiber strands throughout the thermoplastic matrix. Notably, portions of these strands contained within the extruded plastic may be palpable at exposed surfaces, such as the cut ends of an extruded structure. Surfaces not covered by the capstock often exhibit a rough texture to the touch due to the presence of these fiber ends, imparting a slightly furry feel. This bumpiness from the intact pellets and roughness from the separated strands collectively provide significantly enhanced friction for achieving robust coupling between the extruded thermoplastic core and the continuous fiber reinforcements.

The inclusion of chopped strand glass fibers, particularly in the form of pelletized fibers, significantly increases the effective modulus of elasticity of the extruded core. The core material becomes substantially stiffer and stronger due to the presence of these discontinuous reinforcing elements. This enhanced stiffness enables the extruded core to effectively handle the compressive stress imparted by the pre-tensioned continuous fiber reinforcements with substantially less strain than would be experienced in the absence of the chopped strand glass fibers. This reduced strain is crucial for maintaining the critical coupling between the continuous fiber reinforcements and the surrounding extruded core.

The glass fibers constitute a substantial portion of the total mix that is subjected to extrusion. Typically, the glass fibers comprise approximately 15-40% by weight of the extruded material, excluding the co-extruded cap stock. In a particular exemplary embodiment, the glass fibers constitute 20% to 35% by weight of the extruded core material (again, excluding the cap stock).

The various ingredients for the core material mix are introduced into a suitable vessel before the extrusion process and then thoroughly blended to ensure uniformity. Any mixing apparatus capable of effectively blending solid particulate materials can be employed. Prior to extrusion, the mix should be substantially homogeneous. This homogeneity is typically verified by ensuring that two samples of equal volume taken from different locations within the mix exhibit essentially the same mass and the same or very similar concentration of each constituent component (e.g., PVC resin, each additive, and the reinforcing fibers).

In an exemplary implementation of the manufacturing process, an extruded thermoplastic lumber 100 according to the principles of the invention is produced by first extruding a solid structure in the form of a rectangular prism. Simultaneously or subsequently, a protective outer layer (cap stock) is co-extruded onto the core structure. Finally, the continuous extruded thermoplastic lumber is cut to the desired final length.

Unplasticized PVC (PVC-U) is inherently a hard and brittle material. A critical characteristic of PVC is its glass transition temperature (Tg), which signifies the temperature range over which the material undergoes a significant change in its mechanical behavior, transitioning from a hard and stiff state to a more tough and soft one. It is important to note that this transition is not an abrupt point but rather occurs over a temperature range. For typical PVC-U, the glass transition temperature range is centered around approximately 80° C. (176° F.). However, by incorporating plasticizers into the PVC formulation, both the stiffness of the material and its glass transition temperature can be significantly reduced.

Extruded thermoplastic lumber, particularly if it contains plasticizers, may experience a substantial reduction in rigidity if stored outdoors in hot climates. Exposure to intense infrared radiation from the sun can heat the structure, and over time, its internal temperature may approach or even exceed its glass transition temperature, especially if the lumber is dark in color and is stored on a heat-absorbing surface such as blacktop.

To mitigate these effects, the co-extruded outer layer (cap stock) may be specifically formulated to include PVC, various colorants for aesthetic purposes, one or more infrared (IR) and ultraviolet (UV) radiation inhibitors, and impact modifiers to enhance durability. Pigments such as titanium dioxide and zinc dioxide, as well as other infrared reflecting pigments, are highly effective at inhibiting degradation caused by infrared radiation. These additives provide a significant cooling effect by reflecting a substantial portion of the incident solar radiation, thereby helping to maintain the temperature of the extruded thermoplastic lumber below its critical glass transition temperature. Furthermore, the outer layer, being devoid of reinforcing glass fibers, prevents spalling that might otherwise occur from an inner layer containing such fibers. The cap stock may also incorporate a relatively high concentration of impact modifiers to reduce surface brittleness while concurrently shielding the inner core from environmental degradation that could otherwise increase its inherent brittleness over time.

The finished extruded thermoplastic lumber can be handled and maneuvered using the same equipment typically employed for working with conventional wood lumber. It can be readily drilled using ordinary drill bits suitable for drilling wood and can be cut to size using standard saw blades designed for cutting wood. Importantly, the material will not leach toxic chemicals into the environment, is inherently resistant to attack by wood-destroying microorganisms, and possesses adequate structural properties (e.g., compressive strength and modulus of elasticity) sufficient for its intended use as a structural extruded thermoplastic lumber. Depending upon the specific material formulation, the structural properties of the inventive lumber will at least equal, and in many cases exceed or greatly exceed, those of comparable conventional wood lumber.

Figure 3:
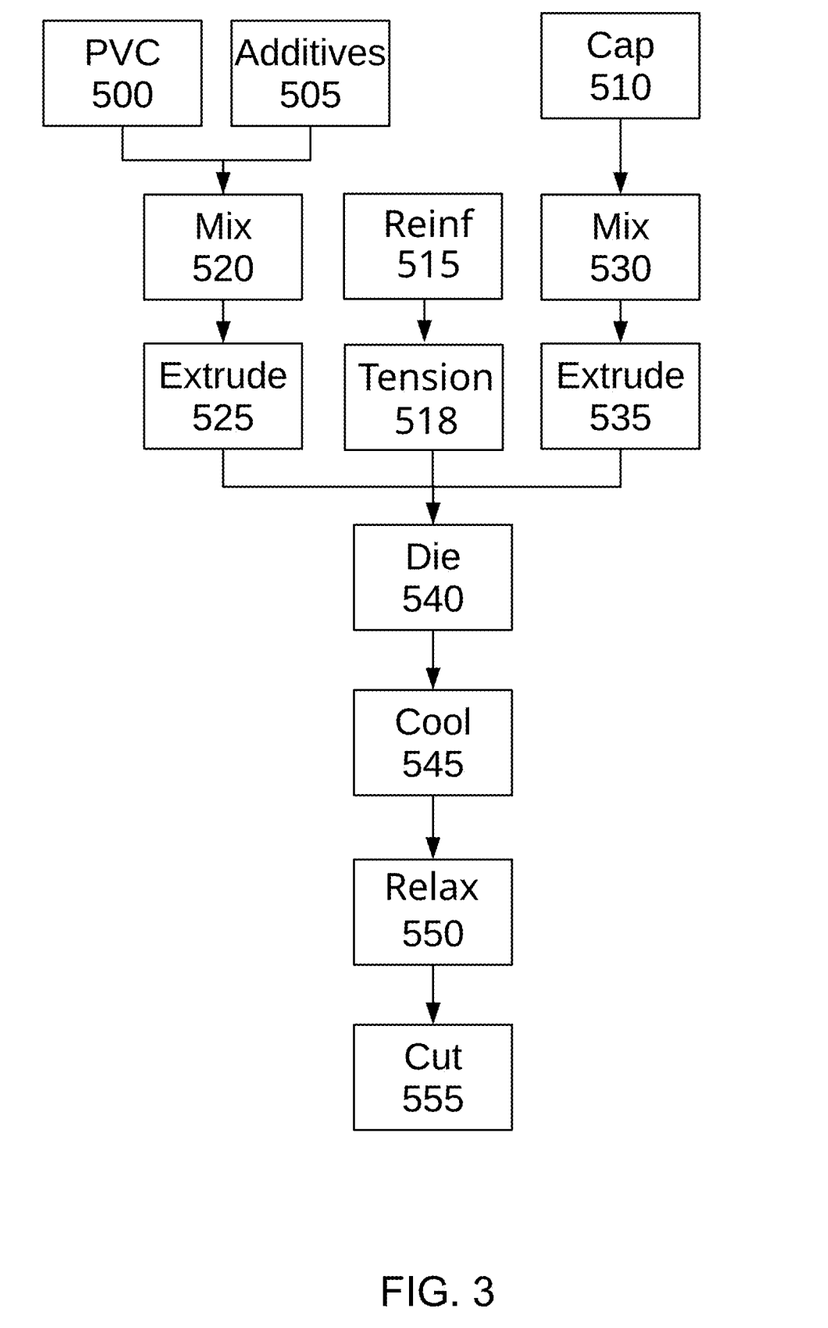
FIG. 3 is a high-level flowchart of steps of an exemplary method of producing an extruded pre-stressed thermoplastic lumber according to principles of the invention.

Referring to the high-level flowchart depicted in FIG. 3, the process of producing the extruded thermoplastic lumber begins with the introduction of a thermoplastic material (e.g., PVC) 200, which may be in the form of pellets, a pre-compounded mixture, or even recycled material, along with the necessary additives 505, including the crucial glass fibers, into a blending apparatus in step 520. Alternatively, the individual ingredients can be gravimetrically fed using separate feeders directly into the extruder feed throat, provided there is sufficient space and a sufficient number of feeders to accommodate all the components of the formulation. Concurrently, the constituent components for the cap stock 510 are blended in a separate step 530. The blended core components are then introduced into a primary extruder, and the blended cap stock components are introduced into a secondary (co-extrusion) extruder, in steps 525 and 535, respectively. This introduction is typically accomplished by placing the pre-blended materials into hoppers positioned above the feed throats of the respective extruders, allowing gravity and the rotation of the extruder screws to feed the formulations into the processing sections. Once fed into the extruders, the polymers are melted or plasticated through the application of heat and mechanical shear, conveyed forward along the extruder barrel by the rotating screw(s), and thoroughly melt mixed to ensure a homogeneous blend of all components. Each extruder then supplies the molten extrudate to a specifically designed inlet of a co-extrusion die. The die shapes the molten extrudates into the desired cross-sectional profile in step 540. Following shaping, the extruded material must be cooled below its glass transition temperature (Tg) to solidify and retain its intended shape, as depicted in step 545. This cooling can be effectively achieved through various methods, including immersion in a water bath, exposure to forced air convection, or contact with a cold surface.

In one preferred implementation, a secondary feed port specifically configured for minimal shear is employed to introduce the pelletized glass fibers into the extruder. Minimizing the shear forces acting on the fibers during their introduction and subsequent processing is crucial for maximizing fiber length retention and maintaining a heterogeneous distribution of glass fiber forms—including strands, clumps, and intact pellets—uniformly encapsulated within the core 105. This secondary feed port is typically located downstream from the primary melting and initial mixing zone of the extruder, where the most intense shear forces are generated. The design of the secondary feed port and the channel leading from it into the main extruder barrel incorporates a gradual transition and a relatively larger cross-sectional area to minimize velocity gradients and thus reduce the shear rates experienced by the material entering through this port. Sharp angles and constrictions within the channel are carefully avoided to prevent fiber breakage. The feeding mechanism associated with the secondary port is designed to introduce the material gently. Gravity feeding or a low-shear feeding mechanism, such as a side stuffer equipped with a slowly rotating auger, may be used instead of high-speed screws to minimize mechanical damage to the fibers. The section of the extruder barrel immediately following the secondary feed port may incorporate specialized low-shear mixing elements. These mixing elements are specifically designed to promote distributive mixing (achieving a uniform spatial distribution of components) rather than dispersive mixing (which involves high shear forces to break down agglomerates), thereby further protecting the integrity of the glass fibers. Examples of such low-shear mixing elements include helical mixing elements or those with interrupted flights.

The incorporation of shear-sensitive (shear-reducing) additives into the PVC matrix can further help to preserve the length of the reinforcing fibers—especially chopped strand glass fiber—during the extrusion process. These additives function by reducing the internal friction within the polymer melt and by minimizing the mechanical stresses that could otherwise lead to fiber breakage or shortening. Examples of such shear-sensitive additives include various lubricants, processing aids, impact modifiers, plasticizers, coupling agents, and even the inclusion of a fraction of low molecular weight PVC resin. Lubricants reduce internal friction and shear by providing slip at critical interfaces within the melt (e.g., between polymer chains or between the polymer and metal surfaces of the extruder). Internal lubricants work by modifying the polymer melt viscosity and reducing internal friction, with examples including calcium stearate, zinc stearate, and montan waxes. External lubricants, on the other hand, promote slip at the interface between the molten polymer and the metal surfaces of the processing equipment (screws, barrel, die), thereby reducing shear at these boundaries; examples include paraffin wax, polyethylene wax, and oxidized polyethylene wax (OPEW). Processing aids, which are typically acrylic-based additives, modify the melt rheology to improve processing characteristics, often at lower shear rates. Acrylic processing aids (e.g., ACRs) can aid in fusion of the PVC particles, lower the torque required for extrusion, and reduce shear stress within the melt; commercially available examples include Rohm & Haas Paraloid™ and Arkema Durastrength™. Certain impact modifiers, particularly those with core-shell structures, can also contribute to reducing melt fracture and shear sensitivity. Examples of such impact modifiers include MBS (methacrylate-butadiene-styrene) and various acrylic impact modifiers. While less commonly considered in the context of structural composites, plasticizers such as DOP (dioctyl phthalate) or DINP (diisononyl phthalate) soften the thermoplastic matrix, which can indirectly lead to a reduction in shear stresses during processing, particularly in applications where some degree of flexibility in the final product is acceptable. While not directly reducing shear forces, coupling agents can improve the stress transfer between the fibers and the matrix and protect the fiber ends from degradation, thereby contributing to the overall performance of the composite. Examples include silane-based coupling agents such as aminopropyltriethoxysilane (APS) and vinylsilane, which are often applied to the fibers during the sizing process and may not necessarily be added directly to the PVC compound. Finally, the addition of a fraction of low molecular weight (LMW) PVC resin can slightly reduce the melt viscosity of the overall blend, which can consequently lead to lower shear stresses during both compounding and extrusion.

The fiber reinforcement rovings, ribbons, or other continuous fiber forms, which may be composed of materials such as fiberglass, carbon fiber, or aramid fiber, may optionally be impregnated with a thermoplastic resin, such as polypropylene, polyethylene, or polycarbonate, prior to the pultrusion process to improve handling and adhesion. Rovings themselves are typically composed of thousands of individual fiber strands bundled together. These impregnated fiber reinforcement rovings are continuously fed into the pultrusion machine, as indicated in step 515 of FIG. 3. The rovings are unwound from spools or creels and are guided through sophisticated tensioning mechanisms to ensure that a consistent and predetermined level of tension is maintained throughout the entire pultrusion process, as shown in step 518. Maintaining proper tension on the fiber reinforcement rovings is of paramount importance throughout the pultrusion process as it directly influences the uniformity, straightness, and ultimate strength of the resulting composite material. Various tension control mechanisms, such as precisely controlled rollers or pulleys, are employed to regulate the pulling force applied to the rovings as they pass through the pultrusion die. The applied tension is carefully controlled to be substantially less than both the ultimate tensile strength of the rovings themselves and the calculated buckling load for the extruded thermoplastic structure to prevent damage or deformation. The applied tension is sufficient to maintain the rovings substantially linear in the extruder. Notably, a higher effective modulus of elasticity in the extruded structure directly translates to a higher buckling load, allowing the structure to absorb greater tensile forces from the rovings without compromising its structural integrity.

Immediately after the molten plastic exits the extrusion die, it remains in a highly viscous, molten state. To ensure the production of a dimensionally accurate and structurally sound final product, this molten extrudate must experience strictly controlled conditions until it solidifies below its glass transition temperature. Various types of sizing or calibrating tools are employed to achieve this critical objective. In an exemplary implementation, the still-molten extrudate passes through a sizing sleeve located within a vacuum sizing tank, which typically contains a temperature-controlled water bath maintained under a negative pressure environment. As the extrudate is drawn through the vacuum sizing tank and over the sizing sleeve, its outer surface is rapidly cooled, and the negative pressure effectively forces the softened plastic against the inner walls of the sizing sleeve, ensuring that the extruded thermoplastic lumber attains its precise final dimensions and a smooth outer surface. It is important to note that while the external surfaces are rendered smooth and accurately sized by this process, the interior surfaces within the core remain relatively rough due to the presence of the glass fibers and pellets.

Once the extruded thermoplastic beam has solidified sufficiently and advanced to the desired point along the production line, it is cut to the appropriate final size. The act of severing the continuous reinforcement rovings effectively removes the applied tensile stress from the finished segment of lumber, as depicted in step 550 of FIG. 3. This severing may be performed as a separate step using dedicated cutting equipment, or it may be integrated as part of the primary cutting step 555 where the extruded thermoplastic lumber is cut to its final specified length. Depending on the specific application requirements, additional finishing operations may be performed either before or after the primary cutting step 555. These may include trimming any excess material from the cut ends or applying surface treatments, such as forming a desired texture or pattern in the co-extruded capstock.

Figure 4:
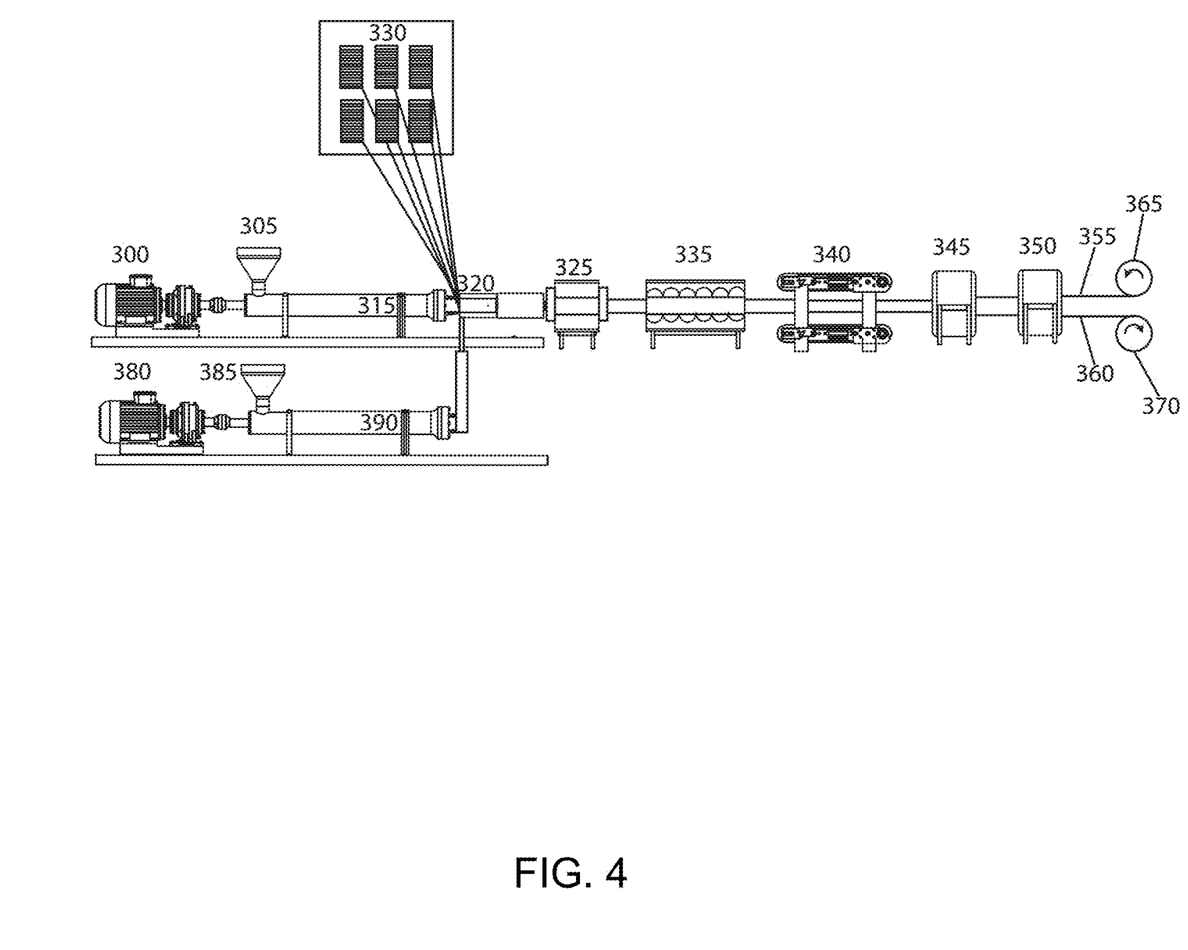
FIG. 4 provides a schematic that conceptually illustrates an extrusion and pultrusion line for producing an exemplary pre-stressed extruded thermoplastic lumber according to principles of the invention.

FIG. 4 provides a high-level schematic representation of an exemplary system designed for extruding the thermoplastic lumber with the simultaneous pultrusion of continuous reinforcements. It should be reiterated that such an extruded thermoplastic lumber may also incorporate chopped strand reinforcing fibers, such as the pelletized chopped glass fibers previously discussed. In this system, raw material comprising a dry blend of polyvinyl chloride powder or pellets and other necessary ingredients, including the pelletized glass fibers, are introduced into the primary extruder through a hopper 305. Simultaneously, the materials for the co-extruded cap stock are introduced through a separate hopper 385 into a dedicated co-extruder 330. A motor 300 provides the power to drive one or more screws within the primary extruder 315, which is responsible for melting, mixing, and conveying the core material. Similarly, another motor 380 powers the screw(s) of the co-extruder 330, which processes the cap stock material. Both extruders apply heat and mechanical shear to the raw materials supplied through their respective hoppers, forcing the resulting molten polymers through a carefully designed co-extrusion die 320.

While FIG. 4 depicts the co-extrusion equipment arranged parallel to the primary extrusion equipment, it is important for those skilled in the art to appreciate that the invention is not limited to this specific physical arrangement of extruders. Rather, the extruders may be positioned in various configurations, including non-parallel, orthogonally arranged, or at obtuse or acute angles, as long as the arrangement is suitable for effectively supplying the molten extruded cap stock material to the designated cap stock ports within the co-extrusion die. Any spatial arrangement that achieves this functional requirement without hindering the overall process falls within the scope of the invention.

In one embodiment of the process, a plurality of continuous reinforcements (e.g., continuous strands in the form of rovings or plys such as mats, fabrics, and veils) extend axially beneath the cap stock, typically running through the core of the extruded structure (or, in alternative configurations, potentially at the outer surface of the core between the core and the cap stock), and are coextensive with the entire length of the extruded lumber. These multiple continuous reinforcements are incorporated into the extruded thermoplastic lumber through the pultrusion process. The spools or packages of reinforcement fiber materials are held on creel racks and are continuously fed through a guiding system, often involving collimation plates or similar devices, to ensure proper alignment and spacing prior to being drawn through the pultrusion section of the die 320 in a progressive manner that is consistent with the desired finished profile of the lumber. Upon exiting the die, the hot extrudate, now containing the continuously fed reinforcements, immediately proceeds to sizing and cooling operations.

The precise final dimensions of the extruded thermoplastic lumber are established and maintained during the sizing operations. The primary purpose of sizing is to hold the still-soft extruded material in its correct dimensional form while it undergoes cooling and solidification. This process is typically accomplished by drawing the hot material as it exits the die 320 through a sizing sleeve 325. The sizing process can utilize either vacuum or positive pressure to ensure proper contact with the sizing sleeve and dimensional accuracy. For example, in a common vacuum sizing system, the hot extrudate is pulled through a precisely dimensioned sizing sleeve 325 or a series of sizing rings while its outer surface is simultaneously cooled sufficiently to maintain the desired dimensions and, if applicable, a circular or other non-rectangular form. The outside surface of the extruded thermoplastic lumber is effectively held against the inner surface of the sizing sleeve by the application of vacuum or negative pressure within the sizing tank.

Optionally, after the extruded thermoplastic lumber exits the vacuum sizing tank 325, or even within the vacuum sizing tank 325 itself, it may pass through one or more cooling sprays or immersion cooling baths 330 and 335. The cooling bath may be an integral part of the vacuum sizing tank or a separate piece of equipment positioned downstream. Various methods of cooling can be employed to effectively remove the residual heat from the extruded thermoplastic lumber. The system may utilize either total immersion of the extrudate in a cooling liquid or spray cooling, although spray cooling is often preferred for larger diameter extrusions where total immersion might be logistically inconvenient. The temperature of the cooling water is typically maintained within a range of approximately 40° to 55° F. to facilitate rapid solidification. The cooling tank 335 may also incorporate annealing zones designed to minimize residual stresses within the extruded lumber by allowing the heat contained within the interior of the product to gradually radiate outward, thus promoting a more uniform and stress-relieved final structure. The total length of the cooling bath must be sufficient to cool the extruded thermoplastic lumber to a temperature well below its glass transition temperature (Tg), for example, below about 175° F. or whatever the specific Tg is for the particular thermoplastic formulation being used. In a typical exemplary implementation, the extruded thermoplastic lumber is cooled to a temperature in the range of approximately 130° F. to 150° F. before exiting the cooling section.

As the extruded thermoplastic lumber is drawn through the cooling tank 335, solidification progresses from the outer surfaces inward toward the center of the structure. Complete cooling necessitates the transfer of all the stored heat energy from within the product to the surrounding cooling water at the outer surfaces. The rate of cooling is significantly influenced by the cross-sectional thickness of the final product; thinner profiles will cool more rapidly to the desired temperature, while thicker products, due to their larger thermal mass and longer heat transfer paths, will take considerably longer to cool uniformly. Being a relatively poor thermal conductor, plastic materials absorb and relinquish heat at a comparatively slow rate. Given the significant amount of thermal energy absorbed by the resin during its residence in the feed hopper, its passage through the heated and mechanically worked extruder, and its shaping in the heated extrusion die, the product requires a substantial amount of time to dissipate this stored heat. The inherent thermal conductivity of the resin material is a fixed property, meaning that the rate of heat transfer is limited, regardless of how cold the water in the quench tank may be.

Optionally, a puller 340 may be integrated into the production line to provide a consistent pulling force on the extruded thermoplastic lumber as it moves through the post-extrusion operations. This puller can also play a role in maintaining the desired thickness of the extrudate by ensuring a constant pulling rate. The speed at which the extruded thermoplastic lumber is pulled by the puller, at least in part, determines the final thickness of the finished product. Increasing the puller speed while maintaining a constant screw speed at the extruder will generally result in a thinner extrudate, whereas reducing the puller speed with the same screw speed will typically lead to a thicker product.

Following the cooling and optional pulling stages, the continuous extruded thermoplastic lumber is cut into specified lengths by a cutter 345. These cut sections are then ready for bundling, storage, and shipping. The extruded thermoplastic lumber can be cut into virtually any desired length (e.g., 8, 10, 13, 16, or even longer feet), although lengths not exceeding approximately 40 to 50 feet are generally preferred for ease of handling and transportation by rail or truck. Bundling the cut lumber provides ease of handling and enhanced safety during loading and unloading operations.

The extrusion line may also include one or more printing stations 350 for applying various notations to the surface of the extruded thermoplastic lumber. These notations can include alphanumeric characters (e.g., numbers and letters for identification or marking) and graphics (e.g., barcodes for inventory tracking and trademarks for branding purposes).

At the very end of the production line, takeup reels 365 and 370 are typically provided. Initially, during the start-up phase of the extrusion and pultrusion process, the continuous reinforcement fibers (represented at the end of the line by 355 and 360, and shown being fed into the die at 330) are fed through all the processing equipment and wound onto these takeup reels. The reels 365 and 370 are driven to rotate at a peripheral speed that precisely matches the linear speed at which the extruded thermoplastic lumber is advancing through the system, while simultaneously maintaining the continuous fibers under a carefully controlled range of tension. Once a sufficient length of extruded thermoplastic lumber has been produced and is ready to be cut, the continuous fibers extending to the takeup reels 365 and 370 are severed, and the operation of the reels may be ceased for the remainder of the extruding session. After the fibers are cut, they remain embedded within the continuously advancing extruded thermoplastic lumber. The ongoing forward movement of the extruded lumber through the rest of the line effectively draws (pulls) the now-embedded continuous fibers further through the system.

As mentioned previously, the co-extruded cap stock may optionally contain various pigments, dyes, and/or other colorants to achieve a desired aesthetic appearance. For example, the cap stock may be formulated using a thermoplastic acrylic resin in combination with pigments, dyes, and/or other colorants to produce a specific visual effect.

Notably, these pigments, dyes, and/or other colorants may even include retroreflective elements, such as microspheres embedded in a binder layer (e.g., the acrylic) along with associated specular or diffuse reflecting materials (e.g., pigment particles, metal flakes, or vapor coats), to impart the property of retroreflection to the lumber. This retroreflective characteristic allows the lumber to efficiently reflect incident light back towards its source, significantly enhancing its visibility under low-light conditions. Thus, the cap stock of extruded thermoplastic lumbers produced according to the principles of this invention may be colored, for instance, red or green and exhibit retroreflective properties, enabling the extruded thermoplastic lumbers to serve effectively as durable and highly visible nautical beacons or other safety markers.

An extrusion process conducted in accordance with the foregoing description is capable of retaining at least 60% of the initial average fiber length of the chopped strand glass fibers. This means that, on average, the length of the glass fibers within the final extruded lumber is at least 60% of their length as they existed before being introduced into the extrusion process (either in their pelletized form or as individual strands if a direct feeding method is used). Achieving this significant level of fiber length retention involves careful attention to several critical factors throughout the manufacturing process. Mechanical stress and abrasion on the fibers during handling, mixing, and feeding into the extruder are minimized through various techniques, such as employing a reduced shear secondary feed port for fiber introduction. If such a secondary feed port for minimal shear is utilized (as previously discussed), introducing the fibers through this port later in the extrusion process helps to preserve their length by reducing their exposure to the most intense shear forces encountered in the initial melting and primary mixing zones of the extruder. Furthermore, the design of the extruder screw itself plays a crucial role; using screw designs with a low length-to-diameter (L/D) ratio in the feeding zone, employing less aggressive screw geometries (e.g., low helix angles, shallow flights), and avoiding sharp transitions or restrictive channels within the extruder barrel that could potentially cause fiber breakage are all important considerations. Operating the extruder at lower screw speeds and melt temperatures can also contribute to reducing the shear forces acting on the delicate glass fibers. Given the inherently high viscosity of PVC, achieving a balance between processability and fiber preservation is key. While PVC does exhibit high melt viscosity, carefully optimizing the level and type of plasticizers and lubricants included in the formulation can help to reduce the drag forces exerted on the fibers during the extrusion process, thereby aiding in fiber length retention.

The level of fiber length retention achieved in the extruded lumber can be verified using a variety of analytical methods. One common method involves acid digestion. In this technique, a precisely weighed sample of the extruded lumber is subjected to a strong acid that dissolves the thermoplastic matrix, leaving behind the reinforcing glass fibers. The lengths of a statistically significant number of the recovered fibers can then be meticulously measured using optical microscopy or sophisticated image analysis techniques. Another verification method involves ashing the thermoplastic sample at high temperatures in a controlled furnace to selectively remove the organic components of the matrix. The remaining inorganic glass fibers can then be carefully dispersed on a slide and their lengths measured using similar microscopic techniques. A third method entails image analysis of microtomed sections. By preparing very thin cross-sections of the extruded lumber (a process known as microtoming) and examining these sections under a high-magnification microscope, the lengths of the fibers embedded within the matrix can be directly measured. This particular method also has the added advantage of providing valuable information about the orientation and distribution of the fibers within the thermoplastic matrix. These various verification methods can be reliably used to assess the effectiveness of the specific processing parameters and material formulations in achieving the desired high level of fiber length retention.

An extrusion produced in accordance with the principles of this invention exhibits a demonstrably higher modulus of elasticity (exceeding 800,000 PSI) than prior art thermoplastic extrusions that do not incorporate both chopped strand and continuous fiber reinforcements in this unique configuration. Depending upon the specific formulation within the parameters outlined above, the modulus of elasticity of the inventive lumber may equal or even exceed 1.2 to $1.9 \times 10^6$ PSI (ksi), thus equaling or exceeding the typical modulus of elasticity of many grades of pine lumber, a common structural material.

To further enhance the structural integrity and longevity of the integrally formed extruded thermoplastic lumber, a critical aspect of the invention lies in the synergistic interaction between the discontinuous chopped strand glass fibers and the continuous reinforcing fibers embedded within the thermoplastic core. The introduction of chopped strand glass fibers (e.g., pelletized chopped strand glass fibers) into the thermoplastic matrix results in a heterogeneous distribution of fiber forms, including intact pellets, clumps of fibers, and individual strands, which become intimately intertwined with the axially extending continuous reinforcing fibers, such as fiberglass rovings or plys.

Along the longitudinal expanse of the continuous reinforcing fibers, the randomly oriented chopped strand glass fibers engage in a complex interplay, establishing numerous points of physical contact and entanglement. These entanglements act as microscopic mechanical keys and locks, forming a multitude of mechanical couplings that significantly impede any tendency for the continuous fibers to debond or delaminate from the surrounding thermoplastic material. This mechanical interlocking is not reliant solely on chemical adhesion between the glass and the polymer, but rather on a robust physical integration within the composite structure. Careful control of the average aspect ratio (length to diameter) of the chopped fibers and their concentration within the core could be strategically tailored to maximize the entanglement density and interfacial friction without compromising the overall processability of the thermoplastic blend.

Furthermore, the inclusion of the chopped strand glass fibers serves to substantially increase the frictional forces at the interfaces between the continuous reinforcing fibers and the thermoplastic matrix. The inherent roughness imparted by the presence of the discontinuous fibers, with their varied orientations and exposed ends, creates a tortuous pathway that resists any relative movement between the continuous reinforcement and the surrounding polymer. This enhanced friction, in conjunction with the mechanical couplings formed by the fiber entanglements, provides a multi-faceted resistance against the forces that could otherwise lead to the separation (delamination) of the continuous reinforcing strands from the thermoplastic core, thereby ensuring the long-term efficacy of the prestressing and the overall structural performance of the lumber.

Notwithstanding the inherent strength and durability of the integrally formed extruded thermoplastic lumber reinforced with glass fibers, the resulting high density can present challenges during handling and installation. Specifically, the lumber exhibits a density significantly greater than that of conventional wood, approximately 2.5 times that of pine, leading to increased weight and greater resistance to typical woodworking operations. While cutting and drilling can be performed with standard power tools, the density contributes to rapid wear of saw blades and a considerable resistance to fastener insertion. A notable issue encountered is the tendency for exterior screws to break before full penetration when threaded directly into the dense material, often necessitating pre-drilled pilot holes to ensure successful fastening.

To mitigate these workability challenges and reduce the overall weight of the extruded thermoplastic lumber, an advantageous enhancement involves the incorporation of a foaming agent, also commonly referred to as a blowing agent, into the thermoplastic formulation. In an exemplary embodiment, the foaming agent is introduced by blending it with the thermoplastic polymer pellets prior to their introduction into the extruder. A suitable range for the addition of the foaming agent may be between 0.1% and 5% by weight of the thermoplastic polymer, though this range may be adjusted based on the desired density reduction and workability enhancements. Various types of foaming agents may be employed, including chemical blowing agents that decompose under the heat of the extrusion process to release gases such as nitrogen, carbon dioxide, or water vapor, and physical blowing agents that are typically low-boiling point liquids or compressed gases that expand upon the reduction of pressure within the extruder. Non-limiting examples of suitable blowing agents include azodicarbonamide (a chemical blowing agent) and hydrofluoroolefins (HFOs) (physical blowing agents).

During the extrusion process, as the thermoplastic material melts and is conveyed along the extruder barrel, the incorporated foaming agent undergoes activation, either through thermal decomposition or a reduction in pressure, resulting in the generation of microscopic gas bubbles within the polymer melt. As the extrudate exits the die and cools, these gas bubbles become entrapped within the solidified thermoplastic matrix, creating a cellular or microcellular structure within the core of the lumber. This introduction of microscopic voids significantly reduces the overall density and weight of the extruded product, bringing it closer to that of conventional wood lumber. Furthermore, the presence of these voids enhances the workability of the material, making it easier to cut with standard saw blades, drill with conventional bits, and, most notably, allowing screws to be threaded more readily without the risk of breakage, often eliminating the need for pre-drilled pilot holes. In these respects, the foamed extruded lumber exhibits a behavior more akin to traditional wood, improving ease of use during construction and installation.

It is acknowledged that the introduction of microscopic voids via the inclusion of a foaming agent can lead to a reduction in the inherent strength of the thermoplastic matrix itself. However, a crucial aspect of this invention is that the significant strength enhancement provided by the incorporation of both the chopped strand glass fibers and the pre-tensioned continuous fiber reinforcements more than compensates for any potential reduction in matrix strength resulting from the foaming process. The synergistic effect of the high-strength reinforcing fibers embedded within the foamed thermoplastic core ensures that the final extruded lumber retains, and in many cases exceeds, the structural performance characteristics required for demanding construction applications, while simultaneously offering the benefits of reduced weight and enhanced workability.

Conventional wood lumber, such as pine, is a natural material derived from trees and inherently exhibits variability in its structural properties. This variability arises from natural defects that are intrinsic to the growth of trees, including knots, cracks, and irregular grain patterns. Knots are remnants of branches and disrupt the continuous wood grain, creating areas of weakness that can significantly reduce the tensile strength and stiffness of the lumber. The presence of large or strategically located knots can compromise the load-bearing capacity of a wooden structural member. Cracks, also known as checks or splits, can develop due to the drying process or mechanical stresses, further weakening the wood's ability to distribute loads evenly and potentially leading to failure under stress. Additionally, irregular grain patterns, often occurring around knots or other growth anomalies, can cause uneven stress distribution within the wood, increasing the risk of shear or tension failures. Fluctuations in moisture content can also exacerbate these defects, leading to shrinkage or swelling that can induce further cracking or warping.

Due to these inherent variabilities, the structural performance of conventional lumber can be unpredictable. Engineers and architects must carefully consider these potential weaknesses when designing load-bearing structures using wood. Lumber grading systems have been established to categorize wood based on the presence and size of these defects, allowing for the selection of appropriate grades to meet specific strength requirements. To ensure structural integrity and safety, designs often incorporate safety factors to compensate for the variability in material properties. Furthermore, techniques such as proper drying and sealing are employed to mitigate the impact of moisture-related defects. Despite these measures, the inherent heterogeneity of wood remains a significant factor in its structural performance and long-term reliability.

In stark contrast to conventional wood lumber, the integrally formed extruded thermoplastic lumber described herein, when properly manufactured under rigorous quality control measures, offers a highly consistent and homogeneous structural material. The core of the extruded lumber comprises a precisely controlled blend of a thermoplastic material, such as PVC, and a specific percentage of chopped strand glass fibers. This manufacturing process allows for a uniform distribution of the reinforcing fibers throughout the thermoplastic matrix, eliminating the natural variability and localized weaknesses associated with knots and irregular grain in wood.

Furthermore, the manufacturing process, involving extrusion and pultrusion of continuous fiber reinforcements, introduces engineered strength and pre-stress throughout the length of the lumber. The co-extruded cap stock provides a uniform outer layer, free from the surface irregularities and potential for degradation seen in natural wood. Unlike wood, the thermoplastic lumber is impervious or highly resistant to fungal decay, insect infestation, and moisture damage. The controlled manufacturing environment and the use of consistent raw materials ensure that each piece of extruded lumber exhibits predictable and reliable structural properties, significantly reducing the need for large safety factors associated with the inherent variability of wood. By implementing thorough quality control procedures during the manufacturing process, the extruded thermoplastic lumber is produced with minimal internal defects, offering a superior level of consistency and long-term performance compared to traditional wood lumber.

To further elaborate on the superior structural capabilities of the extruded thermoplastic lumber, it is important to consider its performance under flexural stress. When a structural member, such as a beam, is supported at both ends and subjected to a transverse force, it undergoes bending. This bending induces internal stresses within the material. The magnitude of this stress is directly related to the applied force and the geometry of the beam, as well as the material's resistance to bending. The ultimate load, or failure load, represents the maximum force that the beam can withstand before structural failure occurs. This failure is typically a result of the material exceeding its ability to resist the bending moment generated by the applied force.

A critical property for evaluating a material's suitability in load-bearing flexural applications is its flexural strength. Flexural strength is defined as the maximum stress experienced by the material at its outermost fibers just before it yields or breaks in a flexural test. It is a key indicator of the material's ability to withstand bending forces without permanent deformation or fracture.

The flexural strength of pine lumber, also known as the modulus of rupture (MOR), varies depending on the species and grade of the wood. For example, Eastern White Pine may have a flexural strength of 8,500 psi, while Southern Yellow Pine may have a flexural strength of about 14,500 psi, and Longleaf Pine may have a flexural strength of about 15,000 psi. Factors like knots, moisture content, and specific grading characteristics can significantly impact its bending properties.

Notably, tests conducted on an extruded thermoplastic lumber formulation incorporating a foaming agent that results in a weight reduction of approximately 10% have demonstrated remarkably improved flexural performance as compared to that of similarly sized conventional pine lumber. These tests have shown that this foamed extruded lumber exhibits a flexural strength that is at least two to four times the flexural strength of conventional pine lumber. This means the extruded lumber does not fail until the applied force is at least two to four times the applied force at which a similarly sized conventional pine lumber failed. Flexural strengths of at least 30,000 psi and at least 60,000 psi have been observed for the extruded lumber. This substantial increase in flexural strength, even with a reduction in weight and density, underscores the potential for the present invention to provide highly workable and significantly stronger structural materials compared to traditional wood. This enhanced flexural performance can lead to designs with increased span distances, reduced material usage, and improved load-bearing capacities in various construction applications.

The integration of a foaming agent, while reducing the overall weight of the lumber, does not compromise, and in fact enhances, its flexural strength due to the controlled and uniform distribution of cells within the thermoplastic matrix, potentially working in conjunction with the glass fiber reinforcement to resist bending and deflection. This enhancement further distinguishes the extruded thermoplastic lumber of the present invention from conventional wood, which, as previously discussed, suffers from inherent variability and weaknesses that limit its flexural strength and overall structural reliability.

In summary, the extruded thermoplastic lumbers produced according to the principles of the invention are characterized by the inclusion of chopped strand glass fibers, such as, but not limited to pelletized glass fibers, within their core structure. A significant portion of these pelletized fibers remains as intact pellets or clumps of fibers within the extruded core, while another portion dissociates into separated individual strands. Critically, all these forms of the chopped strand glass fiber contribute significantly to enhancing the mechanical coupling (bonding) between the thermoplastic core and the pre-tensioned continuous fiber reinforcements that are pultruded through the core. This robust coupling is of paramount importance as it allows for the efficient and effective transfer of the applied tensile stress from the continuous fiber reinforcements to the surrounding thermoplastic core. Unlike prior art approaches where continuous reinforcements might be embedded in a relatively homogeneous and slick plastic matrix, in this invention, the continuous fibers are embedded within a gritty and mechanically entangling composite material due to the presence of the pelletized and fragmented glass fibers. Furthermore, the incorporation of the pelletized glass fibers substantially increases the effective modulus of elasticity of the core material. This enhanced stiffness means that the core can effectively handle the compressive stress imparted by the pre-tensioned continuous fiber reinforcements without undergoing significant buckling or deformation, which also plays a critical role in maintaining the crucial coupling between the continuous fiber reinforcements and the surrounding composite core material. Foaming agents may be added to reduce density, and enhance workability, while maintaining structural properties superior to those of conventional pine lumber.

Any dimensions or measurable properties provided herein are intended as approximate dimensions or properties for an exemplary embodiment and should not be construed as strictly limiting. Dimensions and properties may be varied within reasonable limits without departing from the fundamental scope of the invention. Varied dimensions and properties that do not substantially impair the intended utility of the invention are considered to be within the spirit and scope of the invention. Subject to the foregoing, unless explicitly specified otherwise within this disclosure, any claimed dimensions and quantified properties may be varied by at least ±5% without being considered outside the scope of the invention. The words approximately and about, when used in conjunction with any dimensions or quantified properties denote that the quantified properties may be varied by at least ±5% without being considered outside the scope of the invention.

While an exemplary embodiment of the invention has been described in detail, it should be readily apparent to those skilled in the relevant art that numerous modifications and variations may be made thereto without departing from the true spirit and scope of the invention. With respect to the preceding description, it is to be understood that the optimum relationships for the components and steps of the invention, including potential variations in order, form, content, function, and manner of operation, are deemed readily apparent and obvious to one skilled in the art, and all equivalent relationships to those illustrated in the drawings and described in the specification are intended to be encompassed by the present invention. The preceding description and accompanying drawings are intended to be illustrative of potential modifications that can be made without straying from the fundamental principles of the present invention, the scope of which is to be limited only by the claims that follow. Therefore, the foregoing is to be considered as illustrative only of the principles of the invention. Further, since numerous modifications and changes will readily occur to those skilled in the art, it is not desired to limit the invention to the exact construction and operation as shown and described herein, and accordingly, all suitable modifications and equivalents are intended to fall within the scope of the invention as claimed in the appended claims.

The invention claimed is:

1. An extruded thermoplastic lumber product, integrally formed and comprising:
   a core comprising a blend of a polyvinyl chloride (PVC) thermoplastic material and chopped strand glass fibers, wherein at least 60% of the initial average length of said chopped strand glass fibers is retained after extrusion;
   a plurality of elongated continuous fiber reinforcements embedded axially within and coextensive with said core, wherein said continuous fiber reinforcements are pre-tensioned and pultruded during extrusion; and
   a co-extruded capstock layer forming at least one outer surface of said lumber.

2. The extruded thermoplastic lumber product of claim 1, wherein said chopped strand glass fibers are introduced in pelletized form.

3. The extruded thermoplastic lumber product of claim 2, wherein said pelletized chopped strand glass fibers comprise between 15% and 40% by weight of said core.

4. The extruded thermoplastic lumber product of claim 1, wherein said elongated continuous fiber reinforcements comprise fiberglass rovings.

5. The extruded thermoplastic lumber product of claim 1, wherein said elongated continuous fiber reinforcements comprise plys.

6. The extruded thermoplastic lumber product of claim 1, wherein the chopped strand glass fibers in the core comprise a heterogeneous distribution of glass fiber forms, including strands, clumps, and intact pellets.

7. The extruded thermoplastic lumber product of claim 1, wherein said capstock further comprises at least one ultraviolet (UV) inhibitor and at least one infrared (IR) inhibitor.

8. The extruded thermoplastic lumber product of claim 1, wherein said core further comprises at least one additive selected from the group consisting of: lubricant, plasticizer, heat stabilizer, impact modifier, processing aid, coupling agent, and low molecular weight PVC.

9. The extruded thermoplastic lumber product of claim 1, wherein said lumber exhibits a modulus of elasticity of at least 800,000 psi.

10. The extruded thermoplastic lumber product of claim 1, wherein said lumber exhibits a modulus of elasticity of at least 1,200,000 psi.

11. The extruded thermoplastic lumber product according to claim 1, wherein the core further comprises a foaming agent, resulting in a reduced density and enhanced workability of the extruded thermoplastic lumber.

12. The extruded thermoplastic lumber product of claim 11, wherein the foaming agent is present in a concentration between 0.1% and 5% by weight of the thermoplastic polymer.

13. The extruded thermoplastic lumber product of claim 11, wherein the foaming agent is selected from the group consisting of chemical blowing agents and physical blowing agents.

14. The extruded thermoplastic lumber product of claim 11, wherein said foaming agent reduces the weight of the extruded thermoplastic lumber by at least 5%, and wherein said extruded thermoplastic lumber exhibits a flexural strength at least twice that of conventional pine lumber of comparable dimensions.

15. The extruded thermoplastic lumber of claim 1, wherein said extruded thermoplastic lumber exhibits a flexural strength at least four times that of conventional pine lumber of comparable dimensions.

16. The extruded thermoplastic lumber product according to claim 1, wherein the chopped strand glass fibers within the core interact with the plurality of elongated continuous fiber reinforcements to resist delamination of the continuous fiber reinforcements from the thermoplastic material by forming mechanical couplings through entanglement and increasing friction at the interface between the continuous fiber reinforcements and the thermoplastic material.

17. The extruded thermoplastic lumber product of claim 16, wherein the chopped strand glass fibers comprise pelletized glass fibers that, during extrusion, form a heterogeneous distribution of strands, clumps, and intact pellets that engage with the continuous fiber reinforcements along their length.

18. The extruded thermoplastic lumber product of claim 16, wherein the increased friction at the interface between the continuous fiber reinforcements and the thermoplastic material is further enhanced by a rough surface texture imparted by the presence and varied orientations of the chopped strand glass fibers.

19. An extruded thermoplastic lumber product comprising:
   a core formed from a blend of polyvinyl chloride (PVC) and 20% to 35% by weight chopped strand E-glass fibers having an initial average length between 0.125 and 0.50 inches;
   a plurality of pultruded fiberglass rovings embedded within and coextensive with said core, wherein said rovings are pre-tensioned during extrusion;
   a co-extruded capstock forming an exterior surface of said lumber; and
   wherein said extruded product exhibits a modulus of elasticity in excess of 800,000 psi.

20. The extruded thermoplastic lumber product of claim 19, wherein the chopped strand E-glass fibers in the core comprise a heterogeneous distribution of glass fiber forms, including strands, clumps, and intact pellets.

21. The extruded thermoplastic lumber product of claim 19, wherein said chopped strand E-glass fibers are introduced through a secondary feed port located downstream of a primary melting zone of an extruder, thereby reducing shear and preserving fiber length.

* * * * *